W. L. ECKERY.
HOG RINGING APPARATUS.
APPLICATION FILED JUNE 6, 1922.

1,438,814.

Patented Dec. 12, 1922.
2 SHEETS—SHEET 1.

Inventor
W. L. Eckery,

By
Attorney

W. L. ECKERY.
HOG RINGING APPARATUS.
APPLICATION FILED JUNE 6, 1922.
1,438,814.
Patented Dec. 12, 1922.
2 SHEETS—SHEET 2.
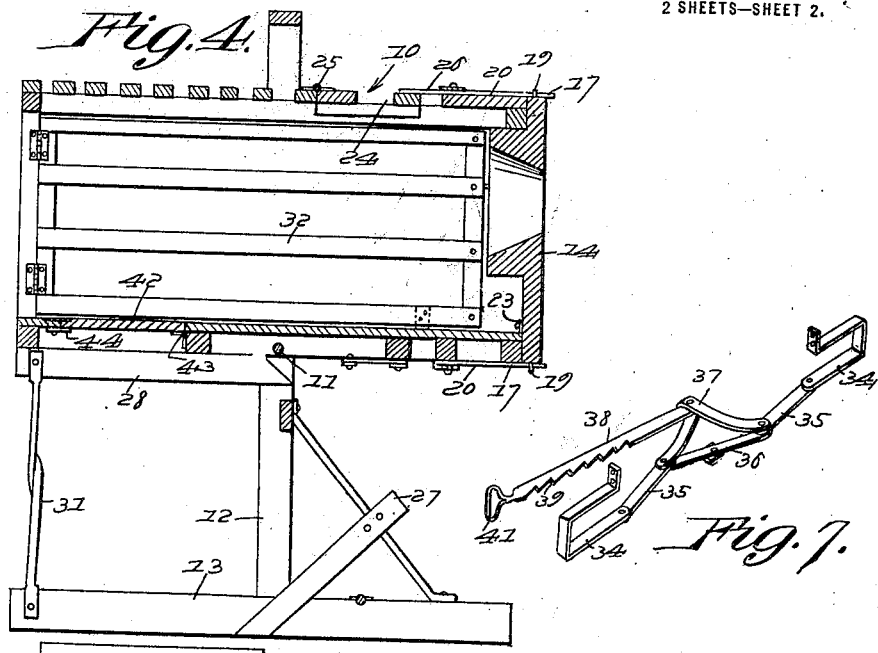
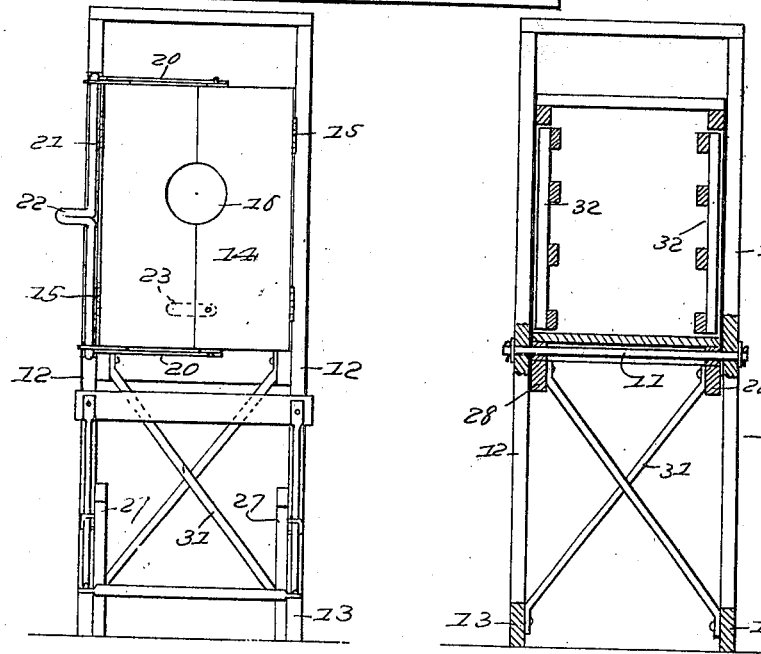
Inventor
W. L. Eckery, Patented Dec. 12, 1922.

1,438,814

UNITED STATES PATENT OFFICE.

WALTER L. ECKERY, OF PERRYVILLE, MISSOURI.

HOG-RINGING APPARATUS.

Application filed June 6, 1922. Serial No. 566,304.

*To all whom it may concern:*

Be it known that WALTER L. ECKERY, a citizen of the United States of America, residing at Perryville, in the county of Perry and State of Missouri, has invented new and useful Improvements in Hog-Ringing Apparatus, of which the following is a specification.

The object of the invention is to provide a simple and efficient construction of hog ringing apparatus designed for holding an animal in the proper position for the nose ringing operation and of facilitating the reception and discharge of the animals successively as they are treated; and with this object in view the invention consists in a construction and combination of parts of which a preferred embodiment is shown in the accompanying drawings, wherein:—

Figure 4 is a vertical section taken longitudinally of the same.

Figures 5 and 6 are respectively front end and transverse sectional views thereof.

Figure 7 is a detail view.

Figure 1:
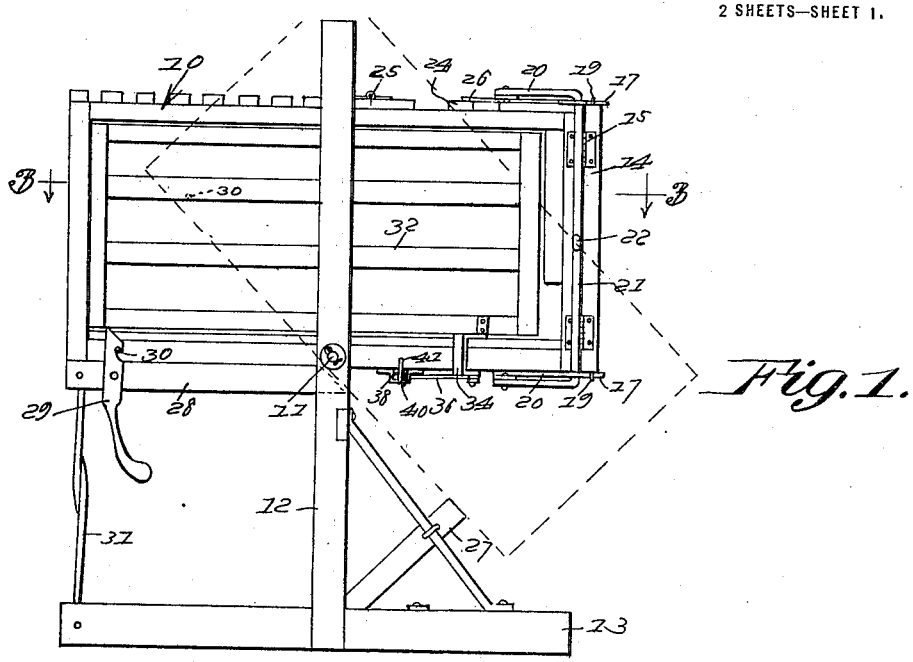
Figure 1 is a side view.
Figure 2:
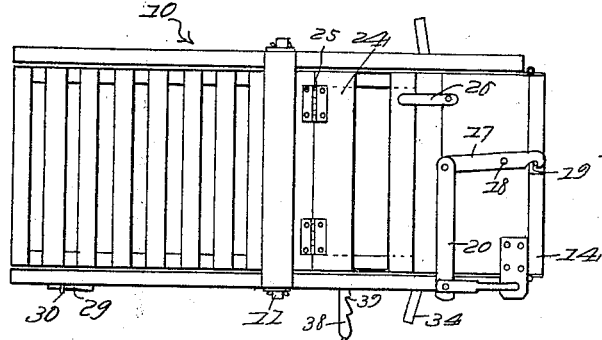
Figure 2 is a plan view of an apparatus embodying the invention.

The apparatus consists essentially of a cage or pen 10 preferably mounted for tilting movement by means of pivots 11 supported by standards 12 rising from a suitable base 13 and having a rear entrance opening through which the stock may be introduced and a front door 14 constructed in sections pivotally mounted as at 15 at their outer edges and provided at their inner edges with registering notches 16 combining to form a neck clamp for engaging and holding the animal during the ringing operation. These door sections are adapted to be secured in their animal clamping relation by means of suitable latches 17 pivotally mounted as at 18 upon the upper and lower walls of the pen or cage for engagement with catch pins 19 and connected by links 20 with a rock shaft 21 arranged vertically at one side of the cage and provided with a handle 22 by which the operator can readily manipulate both latches. One of the door sections is provided at its free edge with a stop 23 so that the engagement of the latch mechanism with the other section is sufficient to lock both in their closed positions. A door 24 hinged as at 25 is arranged to close an opening in the upper wall of the cage and is provided with a suitable latch 26, to give access to the interior of the cage above the animal should it be found necessary. This door provides means for access to the animal for the purposes of vaccination which is usually performed back of the ear.

It will be observed that the cage is mounted with its axis adjacent to the plane of the bottom or lower wall so as to readily tilt to the hog discharging position when released and without effort upon the part of the operator, a suitable stop 27 being provided to limit the tilting movement as indicated by the dotted lines in Figure 1, and when in its normal or horizontal position the cage rests upon a platform frame 28 carrying a latch 29 for engagement with a latch pin 30 on the cage. The free end of said platform is supported by suitable braces 31.

Figure 3:
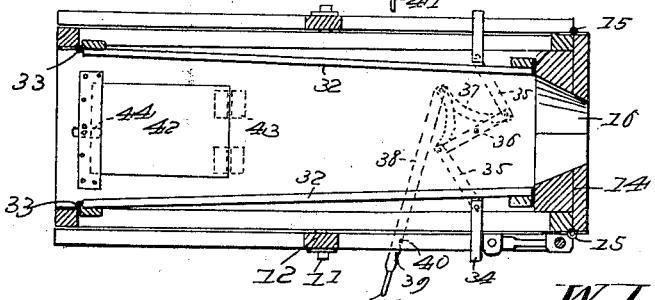
Figure 3 is a horizontal sectional view on the plane indicated by the line 3—3 of Figure 1.

In order that the animal in the cage may be properly positioned laterally to properly present the snout for the ringing operation and to minimize the movement of the animal due to struggling or an effort to escape the side walls of the cage, indicated at 32, are mounted for swinging movement by hinges 33 at their rear ends and are adapted at their forward ends to be moved inwardly so that the said walls occupy a forwardly convergent position or relation as indicated in Figure 3, and this movement of the side walls may also be utilized to retard the discharging or evicting movement of the animal when the cage is tilted to the discharge position indicated in dotted lines in Figure 1, so as to avoid injury to the stock. The control of the swinging side walls is effected by means of yokes 34 respectively connected with the walls near their free forward ends and connected by rings 35 with a rocking lever 36 to an arm 37 of which is connected an operating rod 38 having ratchet teeth 39 for engagement with a stud 40. The outer end of said operating rod is provided with a finger hold or grip 41. Thus an attendant standing at one side of the plane of the cage or pen and grasping the handle can simultaneously move the side walls inwardly or outwardly to suit the size and peculiarities of the animal which is being introduced and guide the forward movement of such animal in order to cause the proper presentation of the head so that when the front door sections are closed to engage the neck the snout is held in proper position for the ringing operation.

For the purpose of castration the door 42 is provided, opening downwardly to permit access to the animal.

Having described the invention, what is claimed as new and useful is:—

1. A hog ringing apparatus having a tiltably mounted cage or pen open at one end for the admission of the stock and provided at the other end with a sectional door having at their free edges registering notches forming a neck engaging clamp, and means for holding the cage or pen in its normal position during the hog ringing operation.

2. A hog ringing apparatus having a tiltably mounted cage or pen open at one end for the admission of the stock and provided at the other end with a sectional door having at their free edges registering notches forming a neck engaging clamp, and means for holding the cage or pen in its normal position during the hog ringing operation, the axis of tilting movement of the cage or pen being adjacent to the plane of the bottom or floor thereof.

3. A hog ringing apparatus having a tiltably mounted cage or pen open at one end for the admission of the stock and provided at the other end with a sectional door having at their free edges registering notches forming a neck engaging clamp, and means for holding the cage or pen in its normal position during the hog ringing operation, the axis of tilting movement of the cage or pen being adjacent to the plane of the bottom or floor thereof, and stops arranged in the path of downward swinging movement of the front end of the cage or pen.

4. A hog ringing apparatus having a tiltably mounted cage or pen open at one end for the admission of the stock and provided at the other end with a sectional door having at their free edges registering notches forming a neck engaging clamp, and means for holding the cage or pen in its normal position during the hog ringing operation, latch mechanism being provided for normally securing the door sections in their closed positions and for releasing the same to permit of the discharge of the confined animal.

5. A hog ringing apparatus having a tiltably mounted cage or pen open at one end for the admission of the stock and provided at the other end with a sectional door having at their free edges registering notches forming a neck engaging clamp, and means for holding the cage or pen in its normal position during the hog ringing operation, the side walls of the cage or pen being inwardly movable to laterally clamp the contained animal.

6. A hog ringing apparatus having a tiltably mounted cage or pen open at one end for the admission of the stock and provided at the other end with a sectional door having at their free edges registering notches forming a neck engaging clamp, and means for holding the cage or pen in its normal position during the hog ringing operation, the side walls of the cage or pen being pivotally mounted for inward swinging movement at their forward ends, and means for securing the same in their adjusted positions.

7. A hog ringing apparatus having a tiltably mounted cage or pen open at one end for the admission of the stock and provided at the other end with a sectional door having at their free edges registering notches forming a neck engaging clamp, and means for holding the cage or pen in its normal position during the hog ringing operation, the side walls of the cage or pen being hingedly mounted at their rear ends for inward swinging movement at their front ends, yokes respectivelyy connected with said walls near their front ends, a rocking lever connected with the yokes, and an operating rod extended from the rocking lever to the side of the cage and having ratchet mechanism for locking the same in its adjusted positions.

In testimony whereof he affixes his signature.

WALTER L. ECKERY.